(12) United States Patent
McKay

(10) Patent No.: US 6,904,845 B2
(45) Date of Patent: Jun. 14, 2005

(54) METHOD FOR PRODUCING ADVERTISING FORMS FOR INSERTION INTO DIFFERENT MAGAZINES

(75) Inventor: Lynda McKay, Shelton, CT (US)

(73) Assignee: Media Networks, Inc., Stamford, CT (US)

(*) Notice: Subject to any disclaimer, the term of this patent is extended or adjusted under 35 U.S.C. 154(b) by 28 days.

(21) Appl. No.: 10/406,824

(22) Filed: Apr. 2, 2003

(65) Prior Publication Data

US 2004/0195753 A1 Oct. 7, 2004

(51) Int. Cl.[7] .................................................. B41C 1/00
(52) U.S. Cl. ............................ 101/483; 101/2; 270/1.01
(58) Field of Search ............................ 270/1.01, 58.01, 270/58.33; 101/2, 483, 484; 705/14

(56) References Cited

U.S. PATENT DOCUMENTS

| | | | |
|---|---|---|---|
| 3,917,252 A | 11/1975 | Harder et al. ................... 270/58 |
| 5,029,830 A | 7/1991 | Quadracci ...................... 270/52 |
| 5,114,128 A | 5/1992 | Harris, Jr et al. ............... 270/11 |
| 5,143,362 A | 9/1992 | Doane et al. ................... 270/1.1 |
| 5,346,196 A | 9/1994 | Nussbaum et al. ............ 270/54 |
| 5,413,321 A | 5/1995 | Banks et al. ................... 270/58 |
| 5,419,541 A | 5/1995 | Stevens ......................... 270/57 |
| 5,428,423 A * | 6/1995 | Clark ............................ 355/77 |
| 6,240,334 B1 | 5/2001 | Duke et al. ................... 700/221 |
| 6,779,789 B1 * | 8/2004 | McKay ..................... 270/52.26 |
| 2002/0046089 A1 | 4/2002 | Zorn .............................. 705/14 |
| 2002/0087594 A1 | 7/2002 | Peters .......................... 707/511 |
| 2002/0161625 A1 | 10/2002 | Brito-Valladares et al. ... 705/10 |
| 2003/0220905 A1 * | 11/2003 | Amado et al. .................. 707/1 |
| 2004/0032606 A1 * | 2/2004 | Edge ........................... 358/1.13 |

* cited by examiner

Primary Examiner—Ren Yan
(74) Attorney, Agent, or Firm—Winston & Strawn LLP

(57) ABSTRACT

The present invention relates to techniques for efficiently producing regional advertising for insertion into different magazines. In an implementation, the method includes establishing a uniform closing period for submission of advertising material, associating the advertising material for different magazines, and ganging forms so that approximately similar quantities of regional advertising for different magazines are printed.

26 Claims, 7 Drawing Sheets

|  | NTW | MAGAZINE | BIND | JOG | MAGAZINE TRIM | OFF-PRESS SIG SIZE | DELIVERED TO BINDERY | BINDERY |
|---|---|---|---|---|---|---|---|---|
| 1 | E | MONEY | PERFECT | FOOT | 8 x 10 1/2 | 8 1/4 x 11 3/8 | 8 1/4 x 10 3/4 | CLARKSVILLE (QW) |
| 2 | E | FSB | PERFECT | FOOT | 8 x 10 1/2 | 8 1/4 x 11 3/8 | 8 1/4 x 10 3/4 | SARATOGA (Q) |
| 3 | E | FORBES | PERFECT | FOOT | 8 x 10 1/2 | 8 1/4 x 11 3/8 | 8 1/4 x 10 3/4 | DYERSBURG (QW) |
| 4 | E | FORTUNE | PERFECT | FOOT | 8 x 10 7/8 | 8 1/4 x 11 3/8 | 8 1/4 x 11 1/8 | CLARKSVILLE (QW) |
| 5 | E | FAST COMPANY | PERFECT | FOOT | 8 3/4 x 10 7/8 | 9 1/4 x 11 3/8 | 9 x 11 1/8 | LOMIRA (Q) |
| 6 | E | INC. | PERFECT | FOOT | 8 3/4 x 10 7/8 | 9 1/4 x 11 3/8 | 9 x 11 1/8 | SUSSEX (Q) |
| 7 | E | BUSINESS WEEK | SADDLE | HEAD | 7 7/8 x 10 1/2 | 8 3/8 x 11 1/8 | 8 3/8 x 10 3/4 | STBG/WAT/TORR/OSBK |
| 8 | F | PARENTS | PERFECT | FOOT | 7 7/8 x 10 1/2 | 8 1/4 x 11 3/8 | 8 1/8 x 10 3/4 | DYERSBURG (QW) |
| 9 | F | PARENTING | PERFECT | FOOT | 7 7/8 x 10 1/2 | 8 1/4 x 11 3/8 | 8 1/8 x 10 3/4 | SUSSEX (Q) |
| 10 | F | FAMILY FUN | PERFECT | FOOT | 7 7/8 x 10 1/2 | 8 1/4 x 11 3/8 | 8 1/8 x 10 3/4 | DYERSBURG (QW) |
| 11 | F | CHILD | PERFECT | FOOT | 9 x 10 7/8 | 9 1/4 x 11 3/8 | 9 1/4 x 11 3/8 | DYERSBURG (QW) |
| 12 | H | COUNTRY HOME | PERFECT | FOOT | 8 x 10 1/2 | 8 1/4 x 11 3/8 | 8 1/4 x 10 3/4 | HARTFORD (Q) |
| 13 | H | BON APPETIT | PERFECT | FOOT | 8 x 10 3/4 | 8 1/4 x 11 3/8 | 8 1/4 x 11 1/8 | DANVILLE (Q) |
| 14 | H | HOUSE & GARDEN | PERFECT | FOOT | 8 x 10 7/8 | 8 1/4 x 11 3/8 | 8 1/4 x 11 1/8 | EFFINGHAM (QW) |
| 15 | H | TRADITIONAL HOME | PERFECT | FOOT | 8 3/8 x 10 7/8 | 8 1/4 x 11 3/8 | 8 5/8 x 11 1/8 | LOMIRA (Q) |
| 16 | H | GARDEN DESIGN | PERFECT | FOOT | 7 3/8 x 10 7/8 | 8 1/4 x 11 3/8 | 9 1/8 x 11 1/8 | SUSSEX (Q) |
| 17 | H | THIS OLD HOUSE | PERFECT | FOOT | 9 x 10 7/8 | 9 1/4 x 11 3/8 | 9 1/4 x 11 3/8 | EFFINGHAM (QW) |
| 18 | L | TRAVEL LEISURE | PERFECT | FOOT | 8 x 10 1/2 | 8 1/4 x 11 3/8 | 8 1/4 x 10 3/4 | SARATOGA (Q) |
| 19 | L | FOOD & WINE | PERFECT | FOOT | 8 x 10 1/2 | 8 1/4 x 11 3/8 | 8 1/4 x 10 3/4 | SARATOGA (Q) |
| 20 | L | VANITY FAIR | PERFECT | FOOT | 8 x 10 7/8 | 8 1/4 x 11 3/8 | 8 1/4 x 11 1/8 | DANVILLE (D) |
| 21 | L | INSTYLE | PERFECT | FOOT | 9 x 10 7/8 | 9 1/4 x 11 3/8 | 9 1/4 x 11 1/8 | BARABOO (P) |
| 22 | M | GOLF | PERFECT | FOOT | 8 x 10 1/2 | 8 1/4 x 11 3/8 | 8 1/4 x 10 3/4 | SUSSEX (Q) |
| 23 | M | TL GOLF | PERFECT | FOOT | 8 x 10 1/2 | 8 1/4 x 11 3/8 | 8 1/4 x 10 3/4 | STRASBURG (P) |
| 24 | M | ESQUIRE | PERFECT | FOOT | 8 x 10 7/8 | 8 1/4 x 11 3/8 | 8 1/4 x 11 1/8 | GLASGOW (D) |
| 25 | M | GQ | PERFECT | FOOT | 8 x 10 7/8 | 8 1/4 x 11 3/8 | 8 1/4 x 11 1/8 | EFFIGHAM (QW) |
| 26 | N | NEWSWEEK | SADDLE | HEAD | 8 x 10 1/2 | 8 3/8 x 11 1/8 | 8 3/8 x 11 1/8 /11/ 10 3/4 | |
| 27 | N | SPORTS ILLUSTRATED | SADDLE | HEAD | 8 x 10 1/2 | 8 3/8 x 11 1/8 | 8 3/8 x 11 1/8 /11/ 10 3/4 | |
| 28 | N | TIME | SADDLE | HEAD | 8 x 10 1/2 | 8 3/8 x 11 1/8 | 8 3/8 x 11 1/8 /11/ 10 3/4 | |
| 29 | N | U.S. NEWS | SADDLE | HEAD | 7 3/4 x 10 1/2 | 8 3/8 x 11 1/8 | 8 3/8 x 11 1/8 /11/ 10 3/4 | |

FIG. 1 Prior Art

| NTW | | MAGAZINE | BIND | JOG | MAGAZINE TRIM | OFF-PRESS SIG SIZE | DELIVERED TO BINDERY | ROLL SIZE (4-8/6/2) | BINDERY |
|---|---|---|---|---|---|---|---|---|---|
| 1 | F | PARENTS | PERFECT | FOOT | 7 7/8 x 10 1/2 | 8 1/4 x 11 3/8 | 8 1/8 x 10 3/4 | 33-24 11/16-16.5 | DYERSBURG (QW) |
| 2 | F | PARENTING | PERFECT | FOOT | 7 7/8 x 10 1/2 | 8 1/4 x 11 3/8 | 8 1/8 x 10 3/4 | 33-24 11/16-16.5 | SUSSEX (Q) |
| 3 | F | FAMILY FUN | PERFECT | FOOT | 7 7/8 x 10 1/2 | 8 1/4 x 11 3/8 | 8 1/8 x 10 3/4 | 33-24 11/16-16.5 | DYERSBURG (QW) |
| 4 | E | MONEY | PERFECT | FOOT | 8 x 10 1/2 | 8 1/4 x 11 3/8 | 8 1/4 x 10 3/4 | 33-24 11/16-16.5 | CLARKSVILLE (QW) |
| 5 | E | FSB | PERFECT | FOOT | 8 x 10 1/2 | 8 1/4 x 11 3/8 | 8 1/4 x 10 3/4 | 33-24 11/16-16.5 | SARATOGA (Q) |
| 6 | E | FORBES | PERFECT | FOOT | 8 x 10 1/2 | 8 1/4 x 11 3/8 | 8 1/4 x 10 3/4 | 33-24 11/16-16.5 | DYERSBURG (Q) |
| 7 | H | COUNTRY HOME | PERFECT | FOOT | 8 x 10 1/2 | 8 1/4 x 11 3/8 | 8 1/4 x 10 3/4 | 33-24 11/16-16.5 | HARTFORD (Q) |
| 8 | L | TRAVEL + LEISURE | PERFECT | FOOT | 8 x 10 1/2 | 8 1/4 x 11 3/8 | 8 1/4 x 10 3/4 | 33-24 11/16-16.5 | SARATOGA (Q) |
| 9 | L | FOOD & WINE | PERFECT | FOOT | 8 x 10 1/2 | 8 1/4 x 11 3/8 | 8 1/4 x 10 3/4 | 33-24 11/16-16.5 | SARATOGA (Q) |
| 10 | M | GOLF | PERFECT | FOOT | 8 x 10 1/2 | 8 1/4 x 11 3/8 | 8 1/4 x 10 3/4 | 33-24 11/16-16.5 | SUSSEX (Q) |
| 11 | M | TL GOLF | PERFECT | FOOT | 8 x 10 3/4 | 8 1/4 x 11 3/8 | 8 1/4 x 10 3/4 | 33-24 11/16-16.5 | STRASBURG (P) |
| 12 | H | BON APPETIT | PERFECT | FOOT | 8 x 10 7/8 | 8 1/4 x 11 3/8 | 8 1/4 x 11 1/8 | 33-24 11/16-16.5 | DANVILLE (D) |
| 13 | E | FORTUNE | PERFECT | FOOT | 8 x 10 7/8 | 8 1/4 x 11 3/8 | 8 1/4 x 11 1/8 | 33-24 11/16-16.5 | CLARKSVILLE (QW) |
| 14 | L | VANITY FAIR | PERFECT | FOOT | 8 x 10 7/8 | 8 1/4 x 11 3/8 | 8 1/4 x 11 1/8 | 33-24 11/16-16.5 | DANVILLE (D) |
| 15 | M | ESQUIRE | PERFECT | FOOT | 8 x 10 7/8 | 8 1/4 x 11 3/8 | 8 1/4 x 11 1/8 | 33-24 11/16-16.5 | GLASGOW (D) |
| 16 | M | GQ | PERFECT | FOOT | 8 x 10 7/8 | 8 1/4 x 11 3/8 | 8 1/4 x 11 1/8 | 33-24 11/16-16.5 | EFFINGHAM (QW) |
| 17 | H | HOUSE & GARDEN | PERFECT | FOOT | 8 x 10 7/8 | 8 1/4 x 11 3/8 | 8 1/4 x 11 1/8 | 33-24 11/16-16.5 | EFFINGHAM (QW) |
| 18 | H | TRADITIONAL HOME | PERFECT | FOOT | 8 3/8 x 10 7/8 | 9 1/4 x 11 3/8 | 8 5/8 x 11 1/8 | 37-27 3/4-18.5 | LOMIRA (Q) |
| 19 | H | FAST COMPANY | PERFECT | FOOT | 8 3/4 x 10 7/8 | 9 1/4 x 11 3/8 | 9 x 11 1/8 | 37-27 3/4-18.5 | LOMIRA (Q) |
| 20 | E | INC. | PERFECT | FOOT | 8 x 10 1/2 | 9 1/4 x 11 3/8 | 9 x 11 1/8 | 37-27 3/4-18.5 | SUSSEX (Q) |
| 21 | H | GARDEN DESIGN | PERFECT | FOOT | 8 7/8 x 10 7/8 | 9 1/4 x 11 3/8 | 9 1/8 x 11 3/8 | 37-27 3/4-18.5 | SUSSEX (Q) |
| 22 | F | CHILD | PERFECT | FOOT | 9 x 10 1/2 | 9 1/4 x 11 3/8 | 9 1/8 x 11 3/8 | 37-27 3/4-18.5 | DYERSBURG (QW) |
| 23 | H | THIS OLD HOUSE | PERFECT | FOOT | 9 x 10 7/8 | 9 1/4 x 11 3/8 | 9 1/4 x 11 3/8 | 37-27 3/4-18.5 | EFFINGHAM (QW) |
| 24 | L | IN STYLE | PERFECT | FOOT | 9 x 10 7/8 | 9 1/4 x 11 3/8 | 9 1/4 x 11 3/8 | 37-27 3/4-18.5 | BARABOO (P) |
| 25 | E | BUSINESS WEEK | SADDLE | HEAD | 7 7/8 x 10 1/2 | 8 3/8 x 11 1/8 | 8 3/8 x 10 3/4 | | STBG/WAT/TORR/OSBK |
| 26 | N | NEWSWEEK | SADDLE | HEAD | 8 x 10 1/2 | 8 3/8 x 11 1/8 | 8 3/8 x 11 1/8 | | |
| 27 | N | SPORTS ILLUSTRATED | SADDLE | HEAD | 8 x 10 1/2 | 8 3/8 x 11 1/8 | 8 3/8 x 11 1/8 | | |
| 28 | N | TIME | SADDLE | HEAD | 8 x 10 1/2 | 8 3/8 x 11 1/8 | 8 3/8 x 11 1/8 | | |
| 29 | N | U.S. NEWS | SADDLE | HEAD | 7 3/4 x 10 1/2 | 8 3/8 x 11 1/8 | 8 3/8 x 11 1/8 | | |

FIG. 3

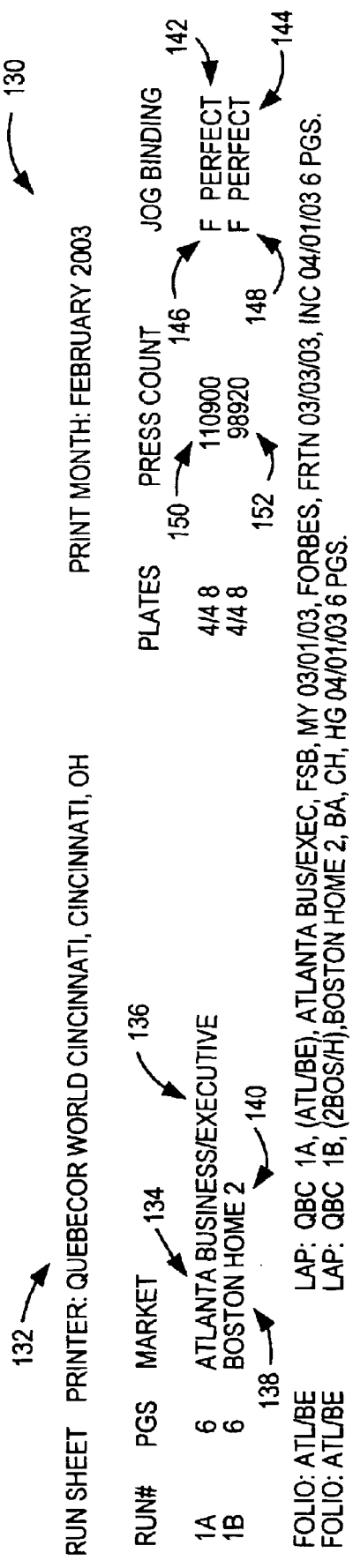
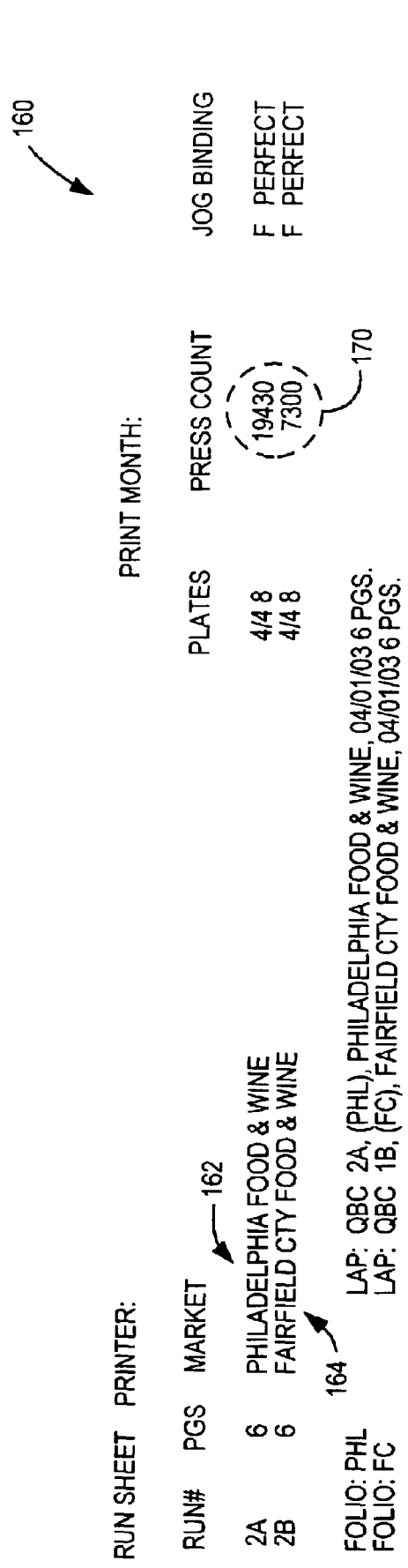
FIG. 4A
FIG. 4B

MNI BID SHEET- DEC. CLOSE
SMALL RUNS

| RUN # | DELIV. | PG.CT. | PB/FT | PAPER | QUANTITY | TIP | SHIP DATE | A | B | C | D |
|---|---|---|---|---|---|---|---|---|---|---|---|
| 1 | AB | 8 | PB/FT | 33" 50# | 40,165 | 1AB | 12/17 | H | H | | |
| 2 | AB | 8 | PB/FT | 33" 50# | 36,330 | 2AB | 12/26 | L | L | | |
| 3 | AB | 8 | PB/FT | 33" 50# | 136,150 | | 1/6 | E | E | | |
| 4 | AB | 8 | PB/FT | 33" 50# | 8,450 | | 1/6 | L | L | | |
| 5 | ABCD | 4 | PB/FT | 33" 50# | 71,500 | 5BC | 12/17 | H | H | H | F |
| 6 | ABCD | 4 | PB/FT | 33" 50# | 26,500 | 6BCD | 12/26 | L | L | L | L |
| 7 | ABCD | 4 | PB/FT | 33" 50# | 18,060 | 7ABCD | 12/26 | L | L | L | L |
| 8 | ABCD | 4 | PB/FT | 33" 50# | 118,200 | | 1/6 | E | E | E | E |
| 9 | ABCD | 4 | PB/FT | 33" 50# | 99,900 | | 12/27 | H | L | E | H |
| 10 | ABCD | 4 | PB/FT | 33" 50# | 63,200 | | 12/27 | H | E | E | E |
| 11 | ABCD | 4 | PB/FT | 33" 50# | 61,600 | | 12/27 | H | E | H | H |
| 12 | ABCD | 4 | PB/FT | 33" 50# | 43,700 | | 12/27 | L | L | E | H |
| 13 | ABCD | 4 | PB/FT | 33" 50# | 31,600 | | 12/27 | H | L | L | L |
| 14 | ABCD | 4 | PB/FT | 33" 50# | 29,000 | | 1/6 | L | L | L | L |
| 15 | ABCD | 4 | PB/FT | 33" 50# | 15,200 | | 1/6 | L | L | L | L |
| 16 | ABCD | 2 | PB/FT | 16-1/2"-60# | 73,300 | 16BC | 12/26 | E | L | L | E |
| 17 | ABCD | 2 | PB/FT | 16-1/2"-60# | 35,600 | 17B | 12/26 | H | L | L | H |
| 18 | ABCD | 2 | PB/FT | 16-1/2"-60# | 19,950 | 18ABCD | 12/17 | H | L | L | L |
| 19 | ABCD | 2 | PB/FT | 16-1/2"-60# | 146,000 | | 12/27 | F | F | E | F |
| 20 | ABCD | 2 | PB/FT | 16-1/2"-60# | 126,800 | | 12/27 | F | E | F | H |
| 21 | ABCD | 2 | PB/FT | 16-1/2"-60# | 120,200 | | 12/27 | F | E | E | F |
| 22 | ABCD | 2 | PB/FT | 16-1/2"-60# | 91,480 | | 12/27 | E | M | M | F |
| 23 | ABCD | 2 | PB/FT | 16-1/2"-60# | 87,700 | | 12/27 | H | L | F | F |
| 24 | ABCD | 2 | PB/FT | 16-1/2"-60# | 68,600 | | 12/27 | F | E | F | E |
| 25 | ABCD | 2 | PB/FT | 16-1/2"-60# | 56,000 | | 12/27 | F | F | H | L |
| 26 | ABCD | 2 | PB/FT | 16-1/2"-60# | 49,100 | | 12/27 | L | H | E | E |
| 27 | ABCD | 2 | PB/FT | 16-1/2"-60# | 46,100 | | 12/27 | L | H | E | H |
| 28 | ABCD | 2 | PB/FT | 16-1/2"-60# | 43,100 | | 12/27 | H | H | H | E |
| 29 | ABCD | 2 | PB/FT | 16-1/2"-60# | 40,460 | | 12/27 | E | M | E | H |
| 30 | ABCD | 2 | PB/FT | 16-1/2"-60# | 39,100 | | 12/27 | H | H | H | H |
| 31 | ABCD | 2 | PB/FT | 16-1/2"-60# | 35,200 | | 12/27 | H | H | E | H |
| 32 | ABCD | 2 | PB/FT | 16-1/2"-60# | 33,100 | | 12/27 | M | F | E | E |
| 33 | ABCD | 2 | PB/FT | 16-1/2"-60# | 29,100 | | 12/27 | H | M | E | H |
| 34 | ABCD | 2 | PB/FT | 16-1/2"-60# | 27,900 | | 1/6 | L | L | L | L |
| 35 | ABCD | 2 | PB/FT | 16-1/2"-60# | 26,500 | | 12/27 | H | H | L | L |
| 36 | ABCD | 2 | PB/FT | 16-1/2"-60# | 23,400 | | 12/27 | H | L | L | L |
| 37 | ABCD | 2 | PB/FT | 16-1/2"-60# | 22,100 | | 12/27 | M | H | F | F |
| 38 | ABCD | 2 | PB/FT | 16-1/2"-60# | 20,000 | | 12/27 | L | H | L | L |
| 39 | ABCD | 2 | PB/FT | 16-1/2"-60# | 10,800 | | 12/27 | H | L | L | H |
| 40 | AB | 6 | PB/FT | 24-11/16"-50# | 171,590 | | 1/6 | E | E | | |
| 41 | AB | 6 | PB/FT | 24-11/16"-50# | 81,650 | | 1/6 | L | L | | |
| 42 | AB | 6 | PB/FT | 24-11/16"-50# | 16,300 | | 12/27 | H | H | | |
| 43 | AB | 6 | PB/FT | 24-11/16"-50# | 14,000 | | 1/6 | L | L | | |
| 44 | AB | 6 | PB/FT | 24-11/16"-50# | 10,700 | | 1/6 | L | L | | |
| | | | | | 2,365,385 | | | | | | |

FIG. 5

METHOD FOR PRODUCING ADVERTISING FORMS FOR INSERTION INTO DIFFERENT MAGAZINES

BACKGROUND

The present invention relates to a method for efficiently producing advertising for insertion into magazines. In particular, the present invention relates to utilizing information concerning different magazine titles in order to efficiently utilize printing press capacity to produce regional magazine advertisements.

Local advertising expenditures in the United States approached about 93 billion dollars in 2002. Newspapers captured about 41% of the market for such expenditures, while television captured about 18%, radio accounted for about 15%, Yellow pages attracted about 12%, other media captured about 12%, and national magazines garnered only about 2%.

Magazines are assembled in a bindery, and the binding type of a magazine determines the particular method used to bind the pages together. A "perfect" bound magazine is one in which the pages are collated consecutively and then glued along their spine. A cover is then wrapped around the spine. A "saddle" bound magazine is one in which the pages are assembled by dropping them onto a chain line (explained below). The cover for a saddle bound magazine is not wrapped but dropped around the pages and then stapled/stitched on the spine to hold the pages of the magazine together. Thus, saddle bound magazines are assembled from the middle sections outward to the cover at the end of the process.

At a bindery, the printed pages of a magazine which contain both content and advertisements are typically loaded into special bins. A saddle production line includes a chain line, while a perfect bound production line includes a belt-way, that travels beneath the bins. Each of the printed pages is dropped onto the chain line, or placed onto the belt-way by a series of mechanisms, to accumulate the pages of a particular magazine. The pages of the magazine are aligned into a stack, trimmed to remove excess paper, and then bound.

A typical advertising signature is a sheet of paper that contains two or more full-page advertisements. If the signature contains more than two advertisements (i.e. is more than two pages), then it is folded in the middle, and a stack of such papers is placed into a particular bin so that the advertising insert will be placed into a location within a magazine by the bindery. A signature is also known as a "form" or "insert".

In some cases, an advertiser requires that a "direct response card" for consumer use be attached to a particular advertisement on a page. Some examples of direct response cards are post-it® type notes, standard three and one half inch by five inch cards, a three and three-eights inch coated tag, and a paper rolodex card or other items. The response cards are attached by companies called "tippers" after the advertisement pages have been printed, using a separate process, or may be affixed by the printer at the end of the print process.

Magazine Advertising Service Companies offer publishers and advertisers magazine advertising marketing services to facilitate the production and delivery of advertising inserts or forms to be bound into magazines. Such companies take advertisement orders, instruct printers to ensure that the advertisements are printed correctly, and coordinate with bindery companies of publishers to assemble the magazines with the advertising inserts. These companies offer advertisers the opportunity to place local or regional advertisements in national magazines.

In order to offer advertisers such services in a cost effective manner, a Magazine Advertising Service Company groups national magazines sharing similar editorial/audience attributes into "networks" so that print efficiency and circulation volume can be achieved. Magazines in a particular network typically share similar demographics, similar interests, and/or share similar editorial appeal of the content. FIG. 1 is a table illustrating how magazines were conventionally grouped into networks. In this example, magazines are grouped into an "Executive" group 30; a "Family" group 32; a "Home" group 34; a "Leisure" group 36; a "Menstyle" group 38 and a "News" group 40. It was recognized that certain printing efficiencies are realized by printing regional advertisements for similar magazines within a particular group.

It was recognized that advertising inserts for two magazines having similar or identical physical properties could be printed on the same printing press to improve printing press utilization. Referring to FIG. 1, column 42 denotes the names of magazines, and the other column headings denote various physical characteristics of the pages of each magazine listed. In particular, the column headings indicate bind 44, jog 46, magazine trim 48, off-press signature size 50, the size delivered to the bindery 52 and the bindery name 54 that assembles that magazine. The "jog" type of a magazine refers to how the printed pages are aligned by a bindery. The bindery machinery typically taps the accumulated pages at the "head" (near the top of the page), or the "foot" (near the bottom of the page) in a manner similar to that used by a person to align a stack of sheets of paper. The "magazine trim" dimensions pertain to the size of one page in the magazine, the "off-press signature size" pertains to the size of a printed sheet including borders, and the "delivered to bindery" size indicates the size of a sheet after it has been printed and trimmed.

Referring again to FIG. 1, the first four magazines of the Executive group 30 all use a perfect bind, are jogged to the foot, have similar magazine trim requirements, similar off-press signature sizes, and have similar sizes delivered to a bindery. Thus, advertisement printing jobs for these four magazines can be married or ganged together to optimize printing press usage. The next two magazines ("Fast Company" and "Inc.") are similar to each other, but have off-press signature sizes and sizes delivered to the bindery that do not match up with those of the first four magazines. Thus, the print runs of advertisement inserts for each of these two magazines can be ganged together, but cannot be married with advertising pages of the first four magazines, even though they are all "Executive Group" magazines as this would result in tremendous waste.

Furthermore, the last magazine listed in the Executive Network ("Business Week") has characteristics such as a saddle bind, jog to the head, and magazine trim size that are incompatible with the characteristics of other magazines in the network. Consequently, print runs for "Business Week" can only be married with each other, and cannot be printed in combinations with any other Executive Network magazine.

It has been recognized that since the same regional advertisements are typically used within a particular network of magazines, a cost savings can be realized if an advertisement or "signature" is printed in bulk and then shipped for insertion to the binderies that assemble those magazines. However, in order to offer such a marketing package, one must consider a minimum circulation of magazines, typically from four to six national magazines, and this is obtained by combining the circulation of such magazines. Then, the advertising can be printed for the total circulation and be distributed among the magazines. The bulk production of the advertising is correlated to the minimum circulation. This correlation is made by ganging or marrying certain groups of magazines that appeal to a particular segment of the population, along with the correlation of similar quantities that are required for different geographical regions.

For example, the advertising is initially designed for inclusion in a network of four news and sports magazines. The circulation for one region is combined with that of another, similarly sized region, e.g., Seattle and Denver. Then, the specifically tailored advertising for each region can be ganged for efficient printing, after which they are separated and distributed to magazine binderies. While such operation is somewhat effective, it forced certain print limitations. For example, four page, six page and eight page inserts had to be printed for one network at a time, which extended the length of time a printer needed to complete the print runs. Printing thus had to be staged, so that inserts for magazines of one network were printed soon after inserts for magazines of another network, in a manner to ensure that the bindery delivery date deadlines could be met. Such restrictions limited the manner in which the printer could manage print runs.

Accordingly, there is a need in the field to control costs and minimize waste. By controlling and ultimately reducing such costs, advertisers will find it more attractive to place regional advertisements in national magazines, and publishers will benefit because of the increased demand for advertising in their magazines. The present invention now provides new and improved ganging or marrying procedures that combine regional advertising for efficient publishing to satisfy this need.

SUMMARY OF THE INVENTION

The present invention provides methods for efficiently producing regional advertising forms for insertion into different magazines. The technique includes establishing a uniform closing period for submission of the advertising material, associating the advertising material for different magazines by magazine attributes, and ganging forms so that approximately similar quantities of regional advertising for different magazines are printed.

The method may include one or more of the following features. The technique may include coordinating paper stock for printing the advertising forms for different magazines. The attributes may include at least one of binding type, off-press signature size, magazine trim, delivered to bindery size, and jog location. The advertising inserts may be ganged according to at least one of geography of market, network, month and size of the insert. The method may further include designating particular printing press outputs for product delivery. The technique may also encompass separating the different markets from the total printed quantities, and shipping the printed forms to magazine binderies that are assembling magazines according to regional delivery.

Another aspect of the invention pertains to a computer program product recorded on a computer-readable medium that includes instructions operable to cause a programmable processor to perform a technique according to the invention. The instructions cause the processor to establish a uniform closing period for submission of magazine advertising material, associate the advertising material for different magazines by magazine attributes, and gang forms so that approximately similar quantities of regional advertising for different magazines are printed.

The computer program may advantageously include one or more of the following features. The computer program may include instructions to cause a programmable processor to coordinate paper stock for printing the advertising forms for different magazines. The attributes may include at least one of binding type, off-press signature size, magazine trim, delivered to bindery size, and jog location. The advertising inserts may be ganged according to at least one of geography of market, network, month and size of the insert. The computer program product may include instructions to cause a programmable processor to designate particular printing press outputs for product delivery. The computer program product may include instructions to cause a programmable processor to separate the different markets from the total printed quantities, and group the printed forms for shipping to magazine binderies that are assembling magazines according to regional delivery.

A further aspect of the invention pertains to a method for efficiently producing regional advertising forms for insertion into different magazines. The technique includes establishing a uniform closing period for submission of advertising material, requesting a monthly press count from each publisher, associating advertising forms for different magazines by network products, and ganging the forms so that approximately similar quantities of various regional forms will be printed together.

This method may include one or more of the following features. The technique may include coordinating paper stock for printing the advertising forms for different magazines. The network products may share attributes that include at least one of binding type, off-press signature size, magazine trim, and jog location, and advertising orders may ganged according to similar print orders and form size. The technique may include designating particular printing press outputs for product delivery, may include separating the different markets from the total printed quantities and shipping respectively the printed forms to magazine binderies that are assembling magazines according to regional delivery, and may include notifying tipping companies if any forms require tipping.

In addition, a computer program product recorded on a computer-readable medium and comprising instructions operable to cause a programmable processor to perform the method as described above may be utilized. The computer program product efficiently produces regional advertising forms for insertion into different magazines, and may include the features set forth above as well.

In yet another aspect, the invention is a method for efficiently producing regional advertising forms for insertion into different magazines. This technique includes establishing a uniform closing date for submission of advertising material, receiving advertising form orders, and ganging advertising forms if they satisfy predetermined magazine advertising form criteria.

The above method may advantageously include one or more of the following features. The magazine advertising form criteria may include at least one of the advertisements sharing the same geography, sharing insertion into magazines that are members of the same cluster, sharing insertion into magazines that are closed in the same month, and sharing similar press counts. This technique may further include separating the different markets from the total printed quantities, and shipping the printed forms to magazine binderies that are assembling magazines according to regional delivery.

A computer program product recorded on a computer-readable medium and comprising instructions operable to cause a programmable processor to perform the above described technique may be used. Such a program includes instructions to establish a uniform closing date for submission of advertising material, receive advertising form orders, and gang advertising forms if they satisfy predetermined magazine advertising form criteria.

The computer program may also one or more of the following features. The magazine advertising form criteria may include at least one of the advertisements sharing the same geography, sharing insertion into magazines that are members of the same cluster, sharing insertion into magazines that are closed in the same month, and sharing similar press counts. The computer program may include instructions to cause a programmable processor to separate the different markets from the total printed quantities, and to group the printed forms for shipping to magazine binderies that are assembling magazines according to regional delivery.

The invention provides a number of advantages. Advertisers benefit because the cost to place a regional advertisement in a national magazine is reduced. Magazine publishers benefit from a consistent, growing revenue stream that provides a bottom-line contribution. In addition, it has been found that the method according to the invention saves a significant amount of paper (e.g. about 30% when compared to the conventional method for marrying insert print runs).

The details of one or more embodiments of the invention are set forth in the accompanying drawings and the description below. Other features and advantages of the invention will be apparent from the detailed description and the drawings, and from the claims.

BRIEF DESCRIPTION OF THE DRAWING FIGURES

In the figures,

FIG. 1 is a table illustrating how magazines were conventionally grouped into networks based on magazine content;

FIG. 3 is a table illustrating a list of magazines divided into clusters based on magazine attributes according to the invention;

FIGS. 4A and 4B are tables illustrating information for print runs;

FIG. 5 is an example of a small runs bid sheet;

Like reference numbers in the figures indicate like elements.

DETAILED DESCRIPTION OF THE PREFERRED EMBODIMENTS

Figure 2:
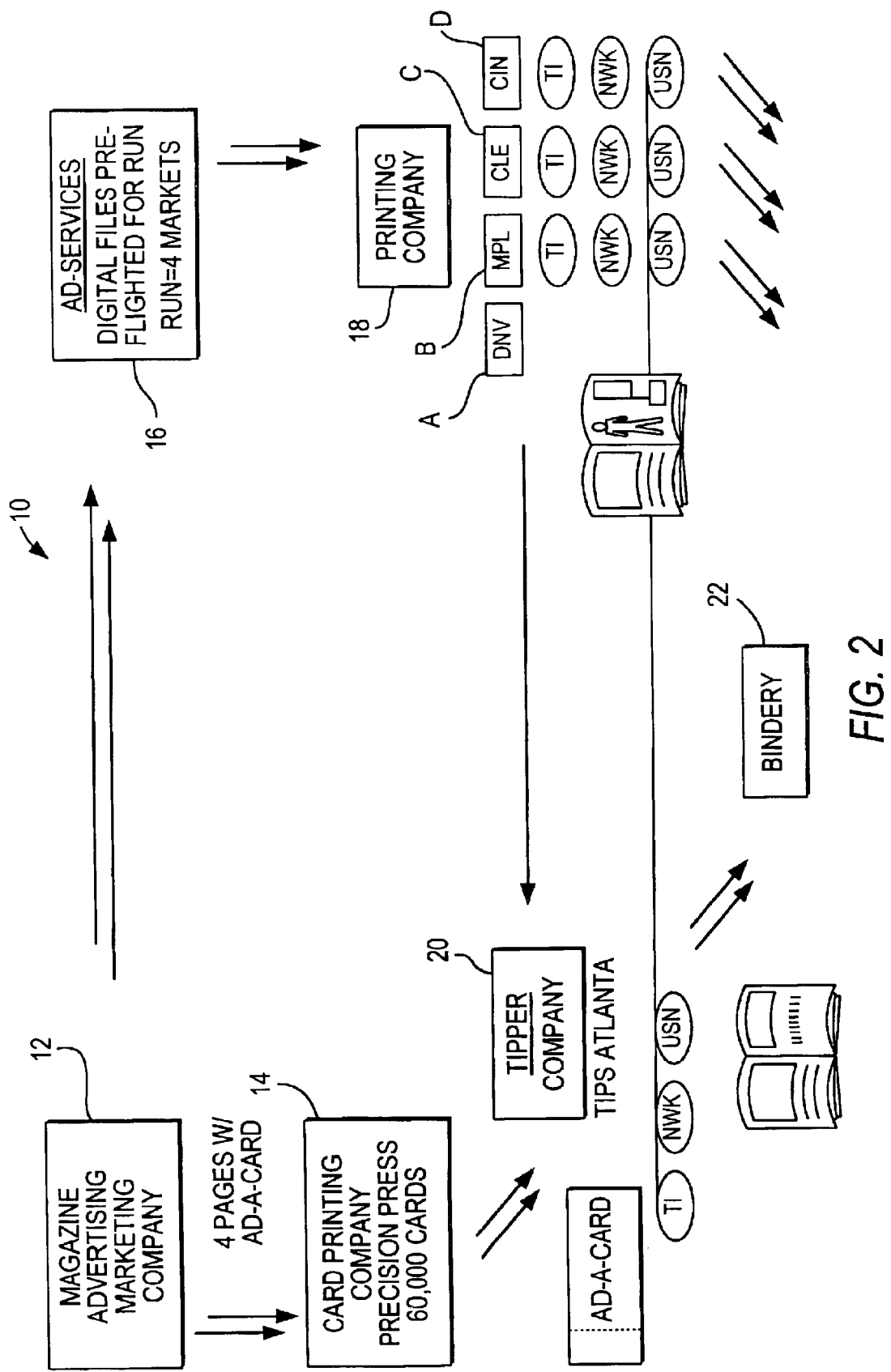
FIG. 2 is a block diagram of the manufacturing flow of an advertisement.

FIG. 2 is a simplified block diagram of the manufacturing flow 10 of an advertisement for insertion into a magazine. A Magazine Advertising Marketing Company 12 receives an order for four pages to appear in a collection of magazines (network) for the Atlanta market. In this example, each form has four full-page advertisements, and one form includes an advertisement with an "Ad-a-card" direct response feature. The Company 12 places an order with a Direct response printing company 14 to manufacture 60,000 cards. The Company 12 also includes an Ad Services Department 16 that pre-flights (or checks) each digital advertising page file. These advertising files define the characteristics and print requirements for each page of advertisement. The Company 12 then places an order with a printing company 18 to commence a print run of the forms. Printing company 18 prints the forms, including the form to be tipped, on their printing press machine. Printing company 18 then sends the form requiring the "Ad-a-card" to a Tipper Company 20 that services the Atlanta market, and Card printing company 14 sends the 60,000 cards to the same Tipper Company. The Tipper Company then attaches the card to the printed advertisement page of the form in the desired orientation. The form with the tipped advertising page, and the other forms are sent to a Bindery Company 22 for insertion of the regional advertisements into the national magazines.

Printing companies that print advertising for magazines use high-speed web offset printing press machines capable of high-quality, four-color production of printed forms. The printing press machines utilize plates to make color or black-and-white impressions on paper rolls fed through the press at high speeds. Each high-speed printing press can utilize up to two webs and sixteen plates. Eight plates are setup on one web and eight are setup on the other web. Each plate is typically capable of printing sixteen-full page advertisements on each side of the paper roll. There are typically four outputs for the high-speed press. Further details of high-speed printing presses are beyond the scope of the present invention and will not be discussed further herein.

Referring again to FIG. 2, each printing press typically has four outputs designated A, B, C and D, and in this example, output A contains the advertising pages to be tipped by the Tipper Company. In the example shown in FIG. 2, one web was used to produce all of the output inserts. Consequently, only one-half of the high-speed press was used to produce all of the outputs. Since printing press utilization is limited by the deliveries, or outputs A, B, C and D, it is critical to maximize press utilization.

On a monthly basis, a Magazine Advertisement Marketing Company may coordinate printing of advertisement pages and supply up to 24 million printed inserts to binderies. (A volume may vary depending on magazine subscription level and the amount of advertising pages sold in any particular month.) In view of the high volume of magazine advertisement pages printed each month, it is good business practice to arrange printing runs of advertisements to optimize printing press usage and minimize waste.

It has been found that printing press utilization can be improved by ganging or marrying advertising pages of magazines across networks. Ganging advertising pages of such different magazines increases the probability of arranging good marriages wherein the press counts for printing runs are very similar, which optimizes printing press usage and minimizes waste. It should be understood that some waste typically occurs due to fluctuations in print count orders from month to month. The present method, however, increases the percentage of good marriages by ganging different magazines across networks in contrast to prior methods.

FIG. 3 is a table 100 that clusters magazines according to their various printing attributes across various networks. In particular, a first cluster 102 includes seventeen magazines, including different magazines which are magazines that belong to different network categories. A second cluster 104 also includes magazine titles that belong to different networks, and a third cluster 106 contains mostly "News" network magazines but also includes one "Executive" network magazine (and may include a magazine that is also used in the "Menstyle" network that is not shown). Thus, there are many more options available for ganging advertising forms for magazines in the cluster 102 than existed in the past when only magazines belonging to the same network were considered for marrying. Referring to the first cluster 102, the listed magazines share the same perfect bind 108, are jogged 110 to the foot, have similar magazine trim 112 and Off-Press signature sizes 114 and have similar delivered to bindery sizes 116. It is also important to recognize that the same roll size 125 and same paper weight are used by a printing press to produce the magazines of the first cluster 102. In particular, the paper stock used for the magazines in cluster 102 is typically 50 pound weight or 60 pound weight. Paper stock of 60 pound weight is a heavy paper stock and is preferred for printing two-page forms to facilitate the binding process for perfect bound magazines. Paper stock of 50 pound weight may be used for printing four, six and eight page forms for perfect bound magazines. These paper stocks are preferred to ensure that the bindery machinery can assemble the magazines without problems occurring, such as mis-feeds or torn pages, during the assembly process. For the saddle bound magazines in cluster 106, a lighter paper stock, such as 38 pound weight paper, may be used because such paper stock is adequate for a bindery to assemble the magazine. Typically, 38 pound paper is the minimum weight paper that a bindery will accept for a four-page form for a saddle-bound publication. Thus, the magazines of the first 102, second 104 and third 106 clusters share similar attributes, including paper stock and physical measurements or dimensions.

In order to be able to gang advertising page runs of different magazines such as those in the first cluster 102 in FIG. 3, the Magazine Advertising Marketing Company sets a closing date which is the deadline for advertisers to send in their insertion orders. In order to be able to marry the markets into shared press runs of inserts across networks, a common close date needs to be established by the Magazine Advertising Services Company. To ensure that similar due dates consistently occur for different magazines from month to month, the Magazine Advertising Marketing Company works with the various magazine publishers to establish a bindery due date. The publishers cooperate because they recognize that operating in this manner to optimize printing press runs lowers the cost for advertisers to obtain regional advertisements in national magazines, which results in a higher volume of advertising pages being ordered. In addition, such operation gives the publishers ample time to establish different versions of their publications.

FIGS. 4A and 4B are tables 130 and 160 that illustrate information for two print runs. Referring to FIG. 4A, a printer 132 has been given a print order that marries or gangs forms for two different magazines according to the present technique. In particular, forms for the Atlanta market 134, Business/Executive magazines 136 are ganged with a Boston market 138, Home network magazines 140. All magazines are perfect bound 142, 144, and are jogged to the foot 146, 148. The press count 150 of the first form is similar to the press count 152 of the second form. The printing press will be set to produce copies according to the higher amount, and thus when publications having similar press counts are ganged together, overall print costs are reduced and paper waste is minimized. In contrast, FIG. 4B illustrates a print run 160 for two magazines that is a bad marriage. The print runs for the Philadelphia market 162 and the Fairfield market 164 for Food & Wine magazine have been married. As shown in dotted line circle 170, the press counts for the two runs are far apart and thus do not match up well which results in much paper and ink waste. Such bad matches frequently occurred when the prior method was utilized of only marrying magazine print runs of publications that belonged to the same network. But such bad marriages are rare when the present technique is employed.

FIG. 5 is an example of a Small Runs Sheet 200, wherein the term "small runs" refers to the page size of "small" (typically eight by ten and seven-eights) magazines. Referring to run 1 across the first row, the "delivery" 202 or printing press output being used are outputs A and B. The page count 204 is eight, the magazines are perfect bound and jogged to the foot (PB/FT) 206, the paper size 210 being used is a thirty-three inch roll size and a 50 pound weight, the quantity output 212 is forty thousand one hundred and sixty-five forms or inserts, the Tip 214 is 1AB so that both outputs would go to a Tipping Company, and the shipping date is December 17. The Market 218 for run 1 for two printing press outputs A and B happens to be the "Home" network for both, but each output could be different. For example, for run 9, the Market 218 includes advertising pages for Home network magazines in output A, Luxury network magazines in output B, Executive network magazines in output C, and another for Home network magazines in output D. Therefore, a combination of advertising page runs for different magazines can be used to obtain printing press efficiencies. Consequently, the printing press outputs are used for product and market delivery of forms instead of solely for market delivery of a particular product.

Magazine subscription sizes as well as advertising pages sold may rise or fall for a particular month. Advertising downturns may occur in a portion of the magazine industry due to economic or other conditions. For example, magazines in the Menstyle network may not be selling well and advertising page orders for these magazines may be down. However, by utilizing the present technique, printing press efficiencies can still be obtained for these magazines by ganging their advertising press runs with those of different magazines as shown at market outputs 250, 252, 254, 256 and 258 in FIG. 5. Thus, the flexibility offered by the present method allows poorly performing magazines to blend in with others so that the overall printing costs for forms are spread out across all product sales. Consequently, the advertising page printing costs can be distributed across the full spectrum of magazines within any of the clusters 102, 104, and 106 of FIG. 3.

A method for efficiently producing regional advertising for insertion into different magazines has been described. In an implementation, a uniform closing period for submission of advertising material for magazines is established with magazine publishers. The advertising material for magazines is then associated depending on magazine page attributes of magazines belonging to different networks. The attributes may include binding type, magazine trim, jog location, off-press signature size, and the delivered-to-bindery size. Advertising forms may be ganged or married by print count so that approximately similar quantities of regional advertising for different magazines can be printed without excessive paper waste. In addition, ganging forms for printing may involve coordinating the paper stock that must be used. The printed advertising forms are then shipped to the binderies that assemble the magazine for a particular market.

Figure 6:
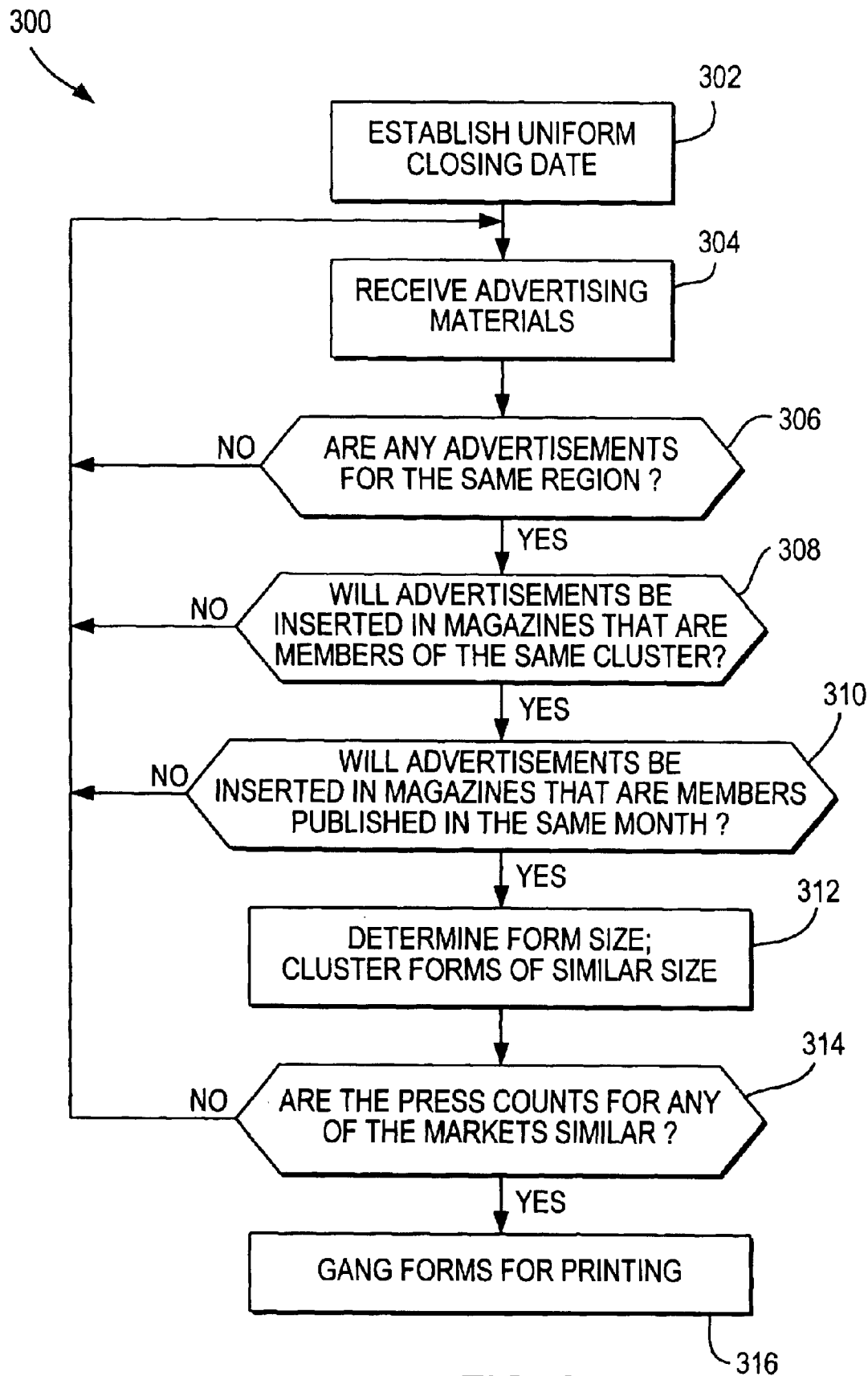
FIG. 6 is a flowchart illustrating another embodiment of a method for ganging forms according to the invention.

FIG. 6 is a flowchart 300 illustrating another embodiment of a method for ganging forms, which will be described as implemented in a programmed computer system. First, a uniform closing date is established (step 302). Next, a plurality of advertising materials are received (step 304). The computer system determines whether any of the plurality of advertising materials are to be run in the same geography, i.e. are for the same region (step 306). If so, then the system checks to see if some of the advertisements will be inserted in magazines that are members of the same cluster (step 308), and if so, if they are scheduled for use in magazines to be published or closed in the same month (step 310). Next, a form size (step 312) is determined based on the number of paid advertising pages (e.g. two, four, six, or eight page forms), and all forms of similar size are clustered (e.g. four-page forms are grouped with other four-page forms). Then it is determined whether the press counts for any of the markets are similar (step 314). The "similarity" of the press counts could be a maximum difference amount determined by various factors on a month-to-month basis, or could be an amount that falls within an acceptable range. If the answer is YES for all steps 306, 308, 310 and 314, then the forms of similar page size are ganged together for printing (step 316). If the answer is NO to any one of the queries in steps 306, 308, 310 or 314, then the process branches back to await further advertising materials (step 304). In this manner, forms are ganged to maximize printing press utilization, which results in lower printing costs and minimizes waste.

Figure 7:
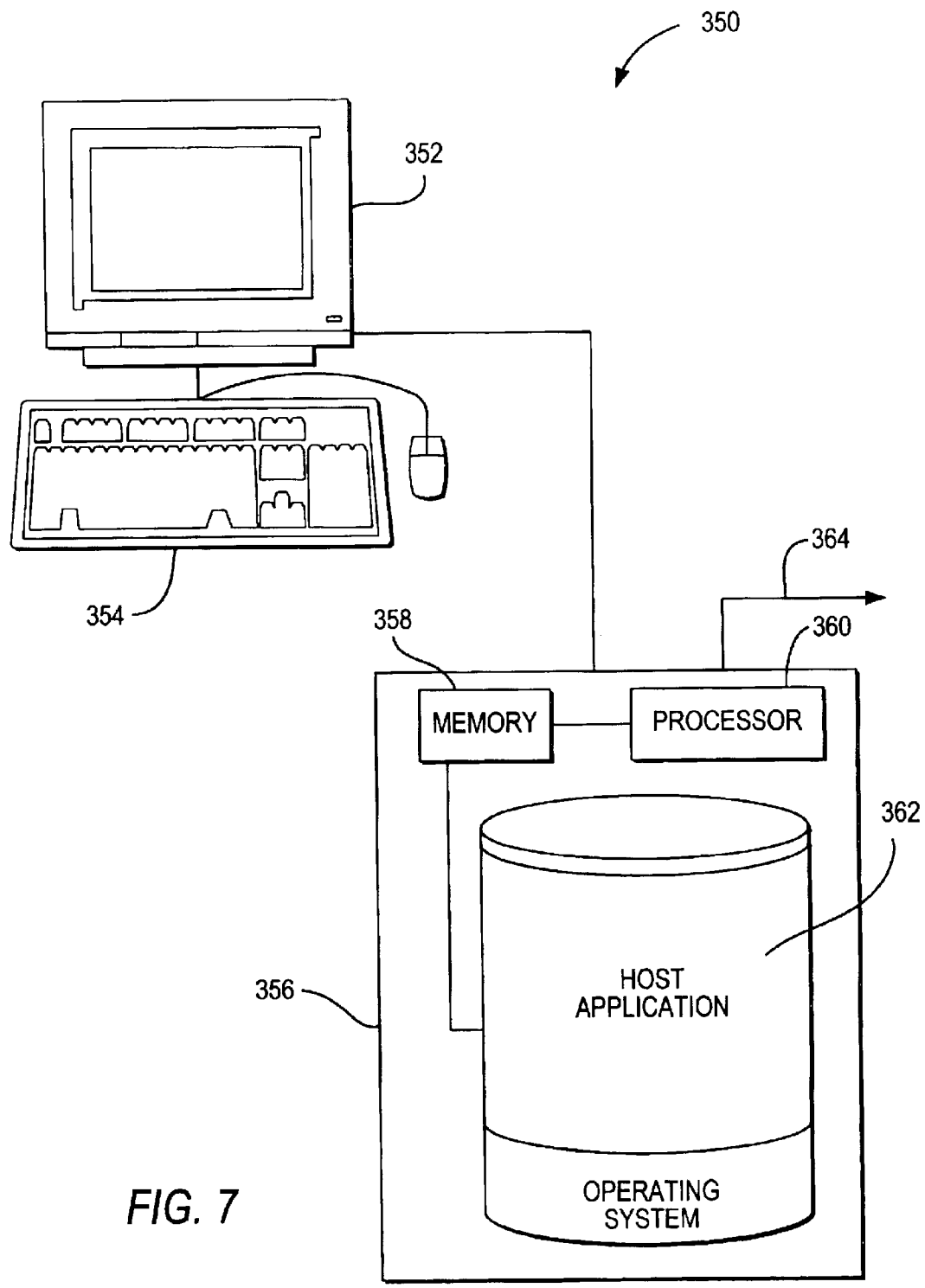
FIG. 7 illustrates a computer system that may be used in accordance with the techniques according to the invention.

FIG. 7 illustrates a computer system 350 that may be used in accordance with the disclosed techniques. The computer system includes a display 352, a keyboard 354, and a digital computer 356. The digital computer 356 includes a memory 358, a processor 360, and may include a mass storage device 362 containing host applications and an operating system. The digital computer 356 may also include other customary components such as a memory bus and a peripheral bus (not shown). The computer system may also include a network connection 364.

The network connection 364 may be a connection to a server computer with access to the internet, or may be a connection to telecommunications lines to an intranet or extranet system, or may be a connection via a wireless system for communications. The network connection may be available for use by advertisers for communication with a Magazine Advertising Marketing Company. Advertising orders and other data may be communicated between the advertisers and the Magazine Advertising Marketing company, which information may be processed by the computer system 350 running a program according to the described techniques to gang advertisements. The output of any such computer program may appear on the display 352 for consideration by a user, and the information displayed may include various ganging options based on the criteria and attributes concerning advertising forms discussed herein.

The invention may be implemented in computer hardware, firmware, software or a combination of the three. However, it is preferable that the implementation of the apparatus of the invention includes a computer program product tangibly embodied in a computer program storage device for execution by a computer processor, and implementation of methods of the invention includes execution of method steps by a computer processor under control of a stored program executed by the processor from a randomly accessible program store to perform the functions of the invention by operating on input data and generating output.

Suitable processors include, for example, general and special purpose microprocessors. In general, a processor will receive instructions from a read-only memory or from a random access memory. Storage devices suitable for tangibly embodying computer program instructions include all forms of non-volatile memory devices, such as semiconductor memory devices like EPROM, EEPROM, flash memory devices; magnetic disks such as internal hard drives an removable disks; magneto-optical disks; and CD-ROM disks.

A number of implementations of the invention have been described. Nevertheless, it will be understood that various modifications may be made without departing from the spirit and scope of the invention. Accordingly, other embodiments are within the scope of the following claims.

What is claimed is:

1. A method for efficiently producing regional advertising forms for insertion into different magazines comprising:
   establishing a uniform closing period for submission of the advertising material;
   associating the advertising material for different magazines by magazine attributes; and
   ganging forms so that approximately similar quantities of regional advertising for different magazines are printed.

2. The method of claim 1 further comprising coordinating paper stock for printing the advertising forms for different magazines.

3. The method of claim 1 wherein the attributes include at least one of binding type, off-press signature size, magazine trim, delivered to bindery size, and jog location.

4. The method of claim 1 wherein advertising inserts are ganged according to at least one of geography of market, network, month and size of the insert.

5. The method of claim 1 further comprising designating particular printing press outputs for product delivery.

6. The method of claim 1 further comprising:
   separating the different markets from the total printed quantities; and
   shipping the printed forms to magazine binderies that are assembling magazines according to regional delivery.

7. A computer program product recorded on a computer-readable medium and comprising instructions operable to cause a programmable processor to:
   establish a uniform closing period for submission of magazine advertising material;
   associate the advertising material for different magazines by magazine attributes; and
   gang forms so that approximately similar quantities of regional advertising for different magazines are printed.

8. The computer program product of claim 7 further comprising instructions to cause a programmable processor to coordinate paper stock for printing the advertising forms for different magazines.

9. The computer program product of claim 7 wherein the attributes include at least one of binding type, off-press signature size, magazine trim, delivered to bindery size, and jog location.

10. The computer program product of claim 7 wherein advertising inserts are ganged according to at least one of geography of market, network, month and size of the insert.

11. The computer program product of claim 7 further comprising instructions to cause a programmable processor to designate particular printing press outputs for product delivery.

12. The computer program product of claim 7 further comprising instructions to cause a programmable processor to:

separate the different markets from the total printed quantities; and group the printed forms for shipping to magazine binderies that are assembling magazines according to regional delivery.

13. A method for efficiently producing regional advertising forms for insertion into different magazines comprising:

establishing a uniform closing period for submission of advertising material;

requesting a monthly press count from each publisher;

associating advertising forms for different magazines by network products;

ganging the forms so that approximately similar quantities of various regional forms will be printed together.

14. The method of claim 13 further comprising coordinating paper stock for printing the advertising forms for different magazines.

15. The method of claim 13 wherein the network products share attributes that include at least one of binding type, off-press signature size, magazine trim, and jog location.

16. The method of claim 13 wherein advertising orders are ganged according to similar print orders and form size.

17. The method of claim 13 further comprising designating particular printing press outputs for product delivery.

18. The method of claim 13 further comprising separating the different markets from the total printed quantities and shipping respectively the printed forms to magazine binderies that are assembling magazines according to regional delivery.

19. The method of claim 13 further comprising informing tipping companies if any forms require tipping.

20. A computer program product recorded on a computer-readable medium and comprising instructions operable to cause a programmable processor to:

establish a uniform closing period for submission of magazine advertising material;

request a monthly press count from each publisher;

associate advertising forms for different magazines by network products; and gang the forms so that approximately similar quantities of various regional forms will be printed together.

21. The computer program product of claim 20 further comprising instructions to cause a programmable processor to coordinate paper stock for printing the advertising forms for different magazines.

22. The computer program product of claim 20 wherein the network products share attributes that include at least one of binding type, off-press signature size, magazine trim, and jog location.

23. The computer program product of claim 20 wherein advertising orders are ganged according to similar print orders and form size.

24. The computer program product of claim 20 further comprising instructions to cause a programmable processor to designate particular printing press outputs for product delivery.

25. The computer program product of claim 20 further comprising instructions to cause a programmable processor to:

separate the different markets from the total printed quantities; and group the printed forms for shipping to magazine binderies that are assembling magazines according to regional delivery.

26. The computer program product of claim 20 further comprising instructions to cause a programmable processor to inform tipping companies if any forms require tipping.

* * * * *